Sept. 2, 1958  J. D. KJORMOE  2,849,826
FISHING LURE
Filed Sept. 28, 1954
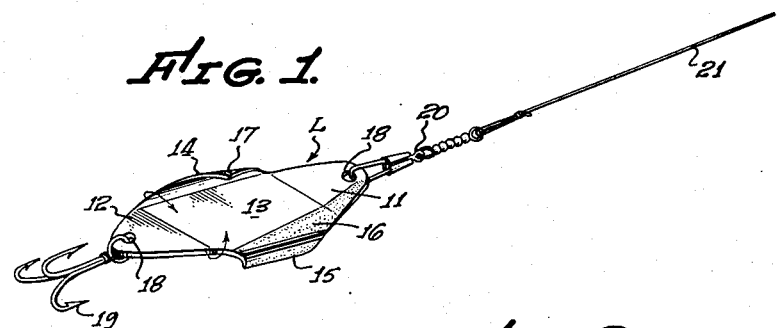
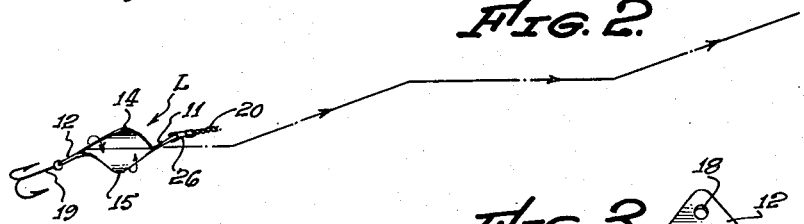
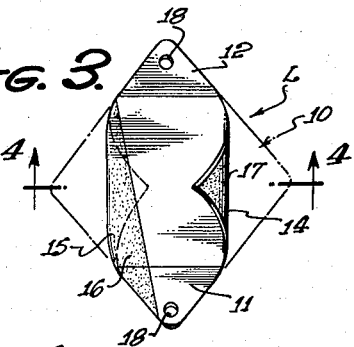
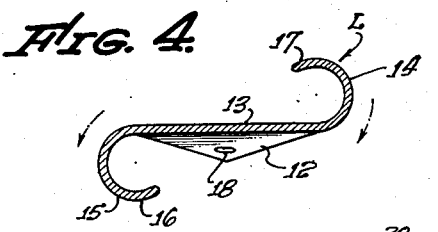
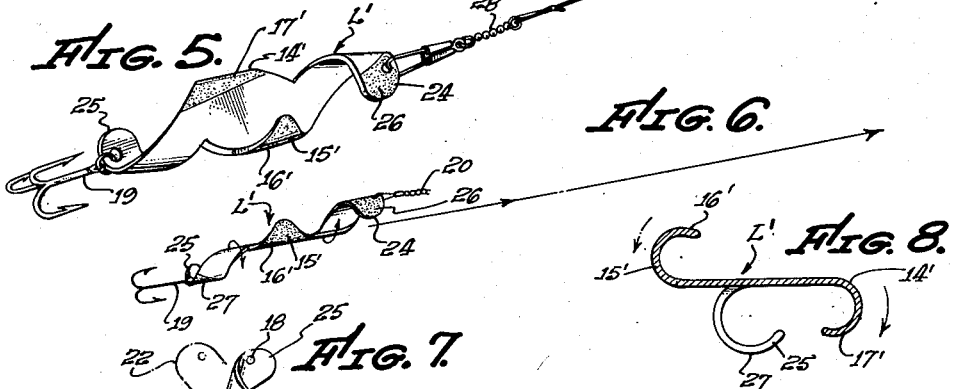
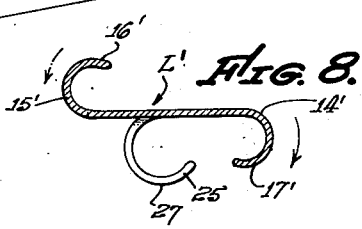
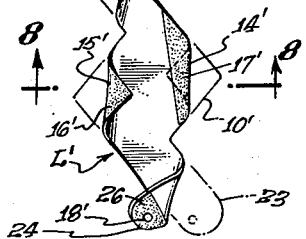
JACK D. KJORMOE,
INVENTOR.
BY
William C. Babcock
ATTORNEY.

United States Patent Office

2,849,826
Patented Sept. 2, 1958

2,849,826
FISHING LURE

Jack D. Kjormoe, Long Beach, Calif.

Application September 28, 1954, Serial No. 458,831

6 Claims. (Cl. 43—42.51)

This invention relates to the art of fishing and particularly to a unique and highly successful form of fishing lure.

A medley of fishing lures have been contrived in the past which rely on a number of different theories for their fish-attracting qualities. Some rely on a spinning of the lure; others, on the use of variegated, brilliant colors; others, on a more or less faithful or, on the other hand, imaginative pictorial representation of bait fish; still others incorporate some or all of these elements. The present invention is markedly in contrast to all of the aforementioned types of lures since it does not spin or continuously revolve about its longitudinal axis; it does not heavily rely on color; and it resembles bait fish only abstractly, if at all. Yet, the present invention has been shown by experience to be highly successful in attracting and effecting the capture of fish, both in fresh and salt water fishing, which is its primary objective.

It is also the objective of the invention to provide a lure of the above indicated character which may, in appropriate variations of size and weight, be used with fly tackle, bait casting rod, spinning reel gear or heavy salt water tackle.

Another object of the invention is to provide a lure which when drawn through the water describes an erratic path and to provide a variation of said lure which has a reciprocating motion as it courses along a substantially straight path.

Another important object of the invention is to provide an indestructible lure of the character described which has such simplicity of structure that it may be economically fabricated thus enabling it to be marketed at a very reasonable price within the reach of all fishermen. The simple unitary structure of the lure is vastly less complicated than most other available lures and it may be constructed without the use of dies or the assembly of parts thus resulting in a novel, simple method of fabricating a lure with hand tools, if desired.

The above advantages and others not specifically set forth will be readily apparent from the following specification and from the attached drawings of the invention and a variation thereof in which drawings:

Figure 1 is a perspective view of the basic form of the device operatively connected to a line or leader;

Figure 2 is a perspective view showing substantially the path described by the device as it is drawn through the water;

Figure 3 is a plan view of the device and also shows in phantom line the flat plan from which the lure is developed;

Figure 4 is a section taken on the line 4—4 of Figure 3;

Figure 5 is a perspective view of a variation of the device shown in Figures 1 to 4;

Figure 6 is a perspective view showing the general path of said variation;

Figure 7 is a plan view of said variation and also shows in phantom line the flat plan from which this variation is developed; and Figure 8 is a section taken on the line 8—8 of Figure 7.

Referring to Figure 1 it may be seen that lure L is formed, as by stamping, from a single piece of sheet material, preferably metal of a non-corrosive character. As is shown in Figure 3, the lure L is developed from a flat blank 10 which is generally diamond shaped in plan view, the corners of blank 10 being rounded off. It will be noted blank 10 and lure L are substantially symmetrical about both the major and minor axis thereof.

Lure L has end portion 11 at one of its longitudinal ends and end portion 12 at the other longitudinal end. End portions 11 and 12 are dished or inclined away from opposite sides of center portion 13 of lure L, said center portion 13 being the planar segment of lure L bounded by said inclined longitudinal end portions 11 and 12, and curled transverse side portions 14 and 15. That is to say, whereas end portion 11 is inclined in one direction relative to the plane of center portion 13, end portion 12 is inclined in the opposite direction relative to the plane of center portion 13.

As may be seen in Figure 4, transverse side portions 14 and 15 also have opposing directions relative to the plane of center portion 13, each of said side portions 14 and 15 being arcuate in cross-section or convoluted relative to center portion 13. Said lure L has first and second painted areas 16 and 17 on opposite surfaces of opposite transverse side portions 14 and 15. Areas 16 and 17 extend to adjoining surfaces of center portion 13 and longitudinal ends portions 11 and 12, area 16 covering portions of the surfaces of end portion 11 and central portion 13 on the same side of lure L as that surface of side portion 15 which faces outwardly of the major axis of lure L and area 16 covering the corresponding portions on the opposite surface of portions 12, 14 and 13. The remaining surface area C on both sides of lure L is plated with a metal that is resistant to both fresh and salt water, and presents a bright, light-reflecting surface.

Each of the longitudinal end portions of lure L has a bore 18 therethrough by means of which bores 18, hook 19 or swivel connection 20 may be attached to lure L whereby it may be drawn through the water by line 21. Said bores 18 are centered along the major axis of blank 10.

Lure L′ is also formed from a blank 10′ which blank 10′ is also of a generally symmetrical diamond shape except that said blank 10′, shown in phantom line in Figure 7, has generally rectangular extensions 22 and 23 extending from the longitudinally diagonal corners of said blank 10′, extension 22 extending in a direction opposite to that of extension 23. The corners of blank 10′ are rounded off and blank 10′ and lure L′ are substantially symmetrical about the minor and major axes thereof.

Lure L′ has transverse side portions 14′ and 15′ structurally identical to side portions 14 and 15 of lure L. Lure L′ also has painted areas 16′ and 17′ located thereon in positions corresponding to areas 16 and 17 of lure L, but areas 16′ and 17′ do not extend onto the longitudinally diagonal extensions 22 and 23.

Extensions 22 and 23 are curled in opposing directions relative to the plane of central portion 13′ of lure L′ to form end portions 24 and 25 of generally arcuate cross section. It will be noted that the axes of the partial cylinders defined by said end portions 24 and 25 are not parallel to the longitudinal axis of lure L′, as may be seen in Figure 7. Bores 18′ formed on extensions 22 and 23 are so located thereon that when said extensions 22 and 23 are curled into end portions 24 and 25, said bores 18′ are along the longitudinal axis of lure L′.

The end portions 24 and 25 have painted areas 26 and 27, area 26 being on one surface of end portion 24 and area 27 being on the other surface of lure L' at end portion 25. Lure L' has brightly plated or polished area C' which extends over all the surfaces of lure L' which are not included within painted areas 16', 17', 26 and 27.

In using the lure L the line or leader 21 and swivel 20 may be attached through either of the bores 18, hook 19 then being attached to the other bore 18. Lure L when drawn through the water will describe the darting path indicated in Figure 2, veering from side to side as well as diving and climbing. In following such path, lure L will tend to roll about its longitudinal axis and will intermittently flip over 180° about its longitudinal axis. End portion 11 tends to cause the lure to rise while end portion 12 tends to cause the lure to dive and as the lure rolls, end portions 11 and 12, simultaneously with their elevator-like action, also exert a rudder-like action, causing the lure to veer from side to side. The rolling of the lure is resisted however, by the stabilizing action of the curled transverse side portions 14 and 15 and thus the pitching, veering and rolling motion of the lure is achieved, such motion being limited by the effects of the side portions 14 and 15 and the end portions 11 and 12.

Lure L' has a wiggling or tail-sweeping motion and reciprocally rolling motion as it courses along a substantially straight path as indicated in Figure 6. As previously noted, the axis of the semi-cylinders defined by end portions 24 and 25 are not in alignment with the axis of lure L' and it is as a consequence of this that lure L' achieves its characteristic wiggling.

The painted areas of both lure L and L' are customarily painted red which, in combination with the highly polished plated area, has proven successful under many conditions in attracting fish. The plated area is very well adapted to capture and reflect the light diffused in the water thus emulating flashes of light from the sweeping tails of game fish. The plated area may however, alternatively be painted another color, such as yellow, in combination with the red areas.

While the particular devices herein shown and described are fully capable of attaining the objects previously stated, it is to be understood that they are merely illustrative of the presently preferred forms of my invention and that they are not restrictive of the details of construction or design herein shown other than as defined in the appended claims.

I claim:

1. A fishing lure comprising a unitary body having a substantially rectangular planar central portion; a first end portion at one of the longitudinal ends of said body, said first end portion being upwardly inclined relative to the plane of said central portion; a second end portion at the other longitudinal end of said body that is identical to said first end portion, said second end portion being downwardly inclined relative to the plane of said central portion; a first side portion at one of the transverse sides of said body, said first side portion being convoluted upwardly relative to the plane of said central portion; a second side portion at the other transverse side of said body that is identical to said first side portion, said second side portion being convoluted downwardly relative to the plane of said central portion; means on said body for fastening to a line; and means on said body for fastening a fish hook thereto.

2. A fishing lure according to claim 1 characterized by the fact that said lure is symmetrical about both its major and minor axes.

3. A fishing lure as defined in claim 1 in which said oppositely inclined first and second end portions are convoluted and in which said first side portion lies on the other side of the longitudinal axis of said lure from said first end portion.

4. A fishing lure as defined in claim 3 characterized by the fact that said lure is symmetrical about its longitudinal, transverse and vertical axes.

5. A fishing lure comprising a unitary body that is made of a rigid sheet material and having a substantially rectangular central planar portion; a first substantially rectangular extension formed at one of the longitudinal ends of said body, said first extension being convoluted upwardly relative to the plane of said central portion; a second substantially rectangular extension formed at the other longitudinal end of said body, said second extension being oppositely disposed to said first extension and being convoluted downwardly relative to the plane of said central portion; a first side portion of said body which lies on the other side of the longitudinal axis of said body from said first extension, said first side portion being convoluted upwardly relative to the plane of said central portion; a second side portion at the other transverse side of said body, said second side portion being convoluted downwardly relative to the plane of said central portion; means on said body for fastening a line thereto; and means on said body for fastening a fish hook thereto.

6. A fishing lure comprising a substantially diamond-shaped metallic sheet of a substantially uniform thickness and having a pair of holes therethrough respectively located adjacent opposite ends of its major axis, both end portions of said sheet being inclined relative to a flat central portion thereof, one end portion upwardly and the other end portion downwardly, thus respectively defining a pair of creases which lie at right angles to said major axis, the two extremities of said sheet at opposite ends of its minor axis being symmetrically convoluted, one upwardly and the other downwardly relative to said flat central portion.

References Cited in the file of this patent

UNITED STATES PATENTS

| | | |
|---|---|---|
| 760,028 | Shulean | May 17, 1904 |
| 1,770,003 | Miller | July 8, 1930 |
| 1,796,590 | Carlson | Mar. 17, 1931 |
| 2,148,799 | Bilinski | Feb. 28, 1939 |
| 2,192,563 | Starkey | Mar. 5, 1940 |
| 2,539,691 | Erickson | Jan. 30, 1951 |
| 2,608,787 | Krogue | Sept. 2, 1952 |
| 2,667,007 | Heron | Jan. 26, 1954 |